United States Patent [19]

Krol et al.

[11] 3,909,781

[45] Sept. 30, 1975

[54] METHOD OF CODE CONVERSION OF MESSAGES

[75] Inventors: Thijs Krol; Nicolaas Alphonsus Maria Verhoeckx, both of Eindhoven, Netherlands

[73] Assignee: U.S. Philips Corporation, New York, N.Y.

[22] Filed: July 26, 1973

[21] Appl. No.: 382,898

[30] Foreign Application Priority Data

Aug. 26, 1972 Netherlands .................. 7211675

[52] U.S. Cl. .... 340/347 DD; 340/146.1 C; 325/155

[51] Int. Cl.[2] .................. H03K 13/24; H04L 3/02

[58] Field of Search ............. 340/347 DD, 356, 354, 146.1 C; 325/155, 64

[56] References Cited

UNITED STATES PATENTS

| | | | |
|---|---|---|---|
| 2,531,435 | 11/1950 | Hoth | 179/1.5 |
| 3,069,657 | 12/1962 | Green, Jr. et al. | 340/171 |
| 3,384,873 | 5/1968 | Sharma | 340/146.1 C |
| 3,449,717 | 6/1969 | Smith et al. | 340/146.1 C |
| 3,510,777 | 5/1970 | Gordon | 325/55 |
| 3,624,637 | 11/1971 | Irwin | 340/347 DD |
| 3,691,554 | 9/1972 | Marschall | 340/347 DD |

*Primary Examiner*—Malcolm A. Morrison
*Assistant Examiner*—Vincent Sunderdick
*Attorney, Agent, or Firm*—Frank R. Trifari

[57] ABSTRACT

A method of code conversion of messages from a first code having a fixed number of multivalent elements, in particular an $n$-element binary code, to a second code. The elements of each code word of the first code are projected onto the first $n$ and onto the last $n$ element positions of a code word comprising $m$ positions of the second code, where $m$ is one of the numbers $2n$-1 and $2n$. The first projection leaves the sequence of the $n$ elements unchanged; the second projection reverses the sequence of the $n$ elements.

9 Claims, 9 Drawing Figures

METHOD OF CODE CONVERSION OF MESSAGES

The invention relates to a method and a device for code conversion of messages from a first code, comprising a fixed number of multi-valent elements, in particular an n-element binary code, to a second code, and also to a method of transmitting the coded messages and to a method and devices for the detection of the coded messages.

Hereinafter, the term messages is to be understood to mean information which is fully or partly intended to form an address of a device, the said address unambiguously identifying the device from a plurality of devices. In systems utilizing digital signals, an address is usually formed by a combination of the binary digits 0 and 1, the said combination being referred to as a word. When a word or a plurality of words are successively transmitted in series form, it is necessary that the receiver which receives the word also receives information which identifies the beginning of the word. The latter information can be presented in different forms, for example, in the form of a unique synchronization word which is transmitted prior to the beginning of the message. This synchronization word must be detected by the unit for synchronizing the receiver, and this unit must ensure that the word phase of the receiver is adjusted to the word phase of the message.

The invention has for its object to realize a coding of the messages such that a message can be received without it being necessary to use a unit in the receiver which synchronizes the receiver to the words of the message when each word of the message is transmitted at least twice in succession without spacing. This object is adapted to selective paging systems with repeated calling, in which an address is transmitted a plurality of times in sucession without spacing. Repeated calling is employed in selective paging systems with portable receivers or pocket receivers in order to increase, the certainty that a call is indeed received by the relevant receiver, in spite of interference and field strength fluctuations.

The method of code conversion of messages according to the invention is characterized in that the $n$-elements of each code word of the first code are projected onto the first $n$-element positions and onto the last $n$ element positions of a series of $m$ element positions of a code word of the second code, in which $m$ is one of the numbers $2n$-1 and $2n$, the said first projection leaving the sequence of the $n$ elements unchanged, whilst said second projection reverses the sequence of the $n$ elements.

The arrangement according to the invention for performing the said method is characterized in that it comprises a register for the storage of the $n$ elements of a code word of the first code, a unit for determining a series of $m$ element positions, and a unit for transferring each element of the code word of the first code to two element positions of the series of $m$ element positions such that with a given sequence of the $m$ element positions the first $n$ element positions contain the address code word in the given sequence, and the last $n$ element positions contain the address code word in the reversed sequence.

The invention will be described in detail hereinafter.

FIGS. 1, 2, 3 and 4 show diagrams of different embodiments of arrangements for performing the method of coding messages according to the invention.

FIGS. 5, 6, 7, 8 and 9 show diagrams of different embodiments of arrangements for detecting the coded messages.

In accordance with the object of the invention, the code words of a first word collection are converted into or projected onto the code words of another word collection, the latter code words being detectable, if repeated twice in succession without spacing, without the use of a separate word synchronization unit being required. Hereinafter, a code will be described by means of which this object can be readily achieved. In view of the structure of the code words, this code will be referred to as "palindrome code".

GENERAL DESCRIPTION OF THE PALINDROME CODE

It is assumed that the messages or addresses which are to be coded according to the palindrome code are available in the form of address code words $w$ of a binary code having a length of $n$ bits. The word collection of this binary code is denoted as W($n$). Each address code word of the word collection W($n$) is a combination of the digits 0 and 1; for the time being it is assumed that all combinations are admissible. It is noted that the following is also applicable if instead of a binary code a ternary code or generally a code comprising multi-valent elements is used. The description is restricted to binary codes only because these codes are most often used in practice.

The address code-word $$w = x_0x_1x_2 \ldots . X_{n-2}x_{n-1} \ (n \text{ bits})$$

can be converted into a palindrome code word pcw according to two methods. According to the first method, a word comprising m = 2n—1 bits is formed:

$$(pcw)_1 = x_0x_1x_2 \ldots . x_{n-2}x_{n-1}x_{n-2} \ldots . x_2x_1x_0 \quad (1)$$

According to the second method, a word comprising m = 2n bits is formed:

$$(pcw)_2 = x_0x_1x_2 \ldots . X_{n-2}x_{n-1}x_{n-1}x_{n-2} \ldots . x_2x_1x_0 \quad (2)$$

It appears from the relation (1) that the palindrome code word is produced by extension of the address code word $w$ by n—1 bit positions and by filling these positions with the first n—1 bits of the address code word $w$, i.e with reversal of the sequence. According to relation (2), the palindrome code word is produced by extension of the address code word $w$ by $n$ bit positions and by filling these positions in the reversed sequence with the $n$ bits of the address code word. The palindrome code word according to relation (1) is mirrorsymmetrically arranged about the position of bit $x_{n-1}$, and the palindrome code word according to relation (2) is mirrorsymmetrically arranged about a point which is situated between the positions of the two bits $x_{n-1}$.

If the following is written for the address code word $w$:

$$w = u\, x_{n-1}$$

where:

$$u = x_0x_1x_2 \ldots . x_{n-2}$$

and for the mirror image of $u$:

$$u' = X_{n-2} \ldots x_2x_1x_0,$$

$(pcw)_1$ can be written as:

$$(pcw)_1 = u\ x_{n-1}u'(3)$$

The following can be written for $(pcw)_2$:

$$(pcw)_2 = w\ w'(4)$$

in which $w'$ is the mirror image of $w$:
$w' = x_{n-1}x_{n-2} \ldots x_2x_1x_0$.

In selective paging systems with repeated calling, each call consists of a series of identical addresses which succeed each other without spacing. If these addresses are coded according to an arbitrary code and if a detector is used which reacts to the pattern of the digits 0 and 1 of the address, reaction of the detector to a call intended for another receiver is not excluded if the time position of the address is not known. This is because it is not precluded that the last bits of an address and the first bits of the next address together constitute another address.

A code word whose first $n-\alpha$ bits ($\alpha$ smaller than $n$ and larger than zero) are formed by the last $(n-\alpha)$ bits of a given code word, and whose last $\alpha$ bits are formed by the first $\alpha$ bits of the given code word, is referred to as the cyclic permutation over $\alpha$ bits of the given code word. The value $\alpha$, indicating the shift between the code word and the cyclic permutation, is referred to as the distance of the cyclic permutation. It may occur that a cyclic permutation of a code word provides the code word itself, for example, as is the case for the code word 101101 in the case of a cyclic permutation over three bits.

If such a series of identical code words is present, and a cyclic permutation of this code word is another code word, the detector which is adjusted to the pattern of this other code will also detect the other code word in the series of identical code words. Such code words are referred to as ambiguously detectable code words. If a cyclic permutation of a code word is identical to the code word itself, the relevant detector will detect the code word a plurality of times per word length in the series of identical code words. This is the case, for example, for the above code word 101101, which is detected twice by the relevant detector per word length of six bits in the series of identical code words. Such code words are referred to as multi-detectable code words. The distance of $\alpha$ bits of a cyclic permutation which is equal to the code word itself is referred to as characteristic distance. The characteristic distance for the above code word 101101 is three bits.

It can be demonstrated that, if the word length $m$ of a palindrome code word is a prime number, there can be no ambiguously detectable palindrome code words and that, moreover, with the exception of the 0-word 000 . . . . 0 and the 1-word 111 . . . . 1, no multi-detectable palindrome code words are possible.

It can furthermore be demonstrated that, if the word length $m$ is an odd number (no prime number), no ambiguously detectable palindrome code words are possible. However, besides the O-word and the 1-word other multi-detectable palindrome code words are possible.

The palindrome code words whose length is a prime number or an arbitrary odd number, are formed according to the relation (1) or (3), with a word length m = 2n−1.

The palindrome code words whose length is an even number are formed according to the relation (2) or (4), with a word length $m$ = 2n.

According to the relation (4):

$$(pcw)_2 = w\ w'$$

The palindrome code word $ww'$ is the cyclic permutation over $$\frac{m}{2} = n$$

bits of the palindrome code word $w'w$. If all possible address code words are admitted to the word collection $w(n)$, all palindrome code words which can be formed from these address code words will be ambiguously detectable or multi-detectable.

A first step to avoid ambiguity is to exclude the mirror image $w'$ when the address code word $w$ is admitted to the word collection $W(n)$. This step has different degrees of effectiveness for $n$ belonging to the category of the prime numbers, the odd numbers (no prime numbers) or the even numbers.

If $n$ is a prime number, the result of the step is that none of the remaining palindrome code words is ambiguously detectable. The remaining multi-detectable palindrome code words all belong to the group for which $w = w'$, and vice versa all palindrome code words which belong to this group are multi-detectable. If the address code words for which w = w' are also excluded from the word collection $W(n)$, none of the remaining palindrome code words will be ambiguously detectable or multi-detectable.

If $n$ is an odd number (no prime number), the first step results in that none of the remaining palindrome code words is ambiguously detectable. However, multi-detectable palindrome code words remain possible.

If $n$ is an even number, the first step results only in that the number of ambiguously detectable palindrome code words is reduced. However, this number is not reduced to zero. The remaining ambiguously detectable palindrome code words belong to the group for which w = w'. When the group of address code words for which w = w' is also excluded from the word collection $W(n)$, no further ambiguously detectable palindrome code words will be possible. However, the latter step also excludes a number of words which are not ambiguously detectable but multi-detectable. Exclusion of the address code words for which w = w' is therefore an adequate but not necessary condition for the absence of ambiguously detectable palindrome code words.

The below survey shows the number of admitted code words of the word collection $W(n)$ for the various categories of the numbers $m$ and $n$, ambiguously detectable palindrome code words being each time excluded. If multi-detectable palindrome code words are also excluded, this is denoted by the letter A in the last column.

| length m | maximum number of code words of w(n) | | |
|---|---|---|---|
| prime number | $2^n$ | $= 2^{\frac{m+1}{2}}$ | |
| (m = 2n − 1) | $2^n - 2$ | $= 2^{\frac{m+1}{2}} - 2$ | A |
| odd number (no prime number) (m = 2n − 1) | $2^n$ | $= 2^{\frac{m+1}{2}}$ | |

-Continued

| length m | maximum number of code words of w(n) |
| --- | --- |
| twice a prime number (m = 2n) | $2^{n-1} + 2^{\frac{n-1}{2}} = 2^{\frac{m-2}{2}} + 2^{\frac{m-2}{4}}$ |
| | $2^{n-1} - 2^{\frac{n-1}{2}} = 2^{\frac{m-2}{2}} - 2^{\frac{m-2}{4}}$ A |
| twice an odd number (m = 2n) (n is no prime number) | $2^{n-1} + 2^{\frac{n-1}{2}} = 2^{\frac{m-2}{2}} + 2^{\frac{m-2}{4}}$ |
| twice an even number (m = 2n) | $2^{n-1} - 2^{\frac{n-2}{2}} = 2^{\frac{m-2}{2}} - 2^{\frac{m-4}{4}}$ |

Figure 1:
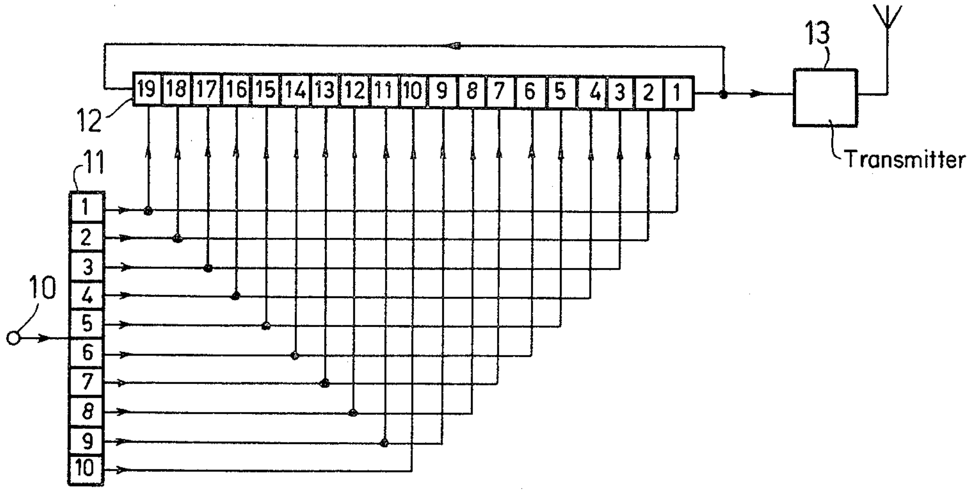
FIG. 1 shows the diagram of a transmitter for a selective paging system with repeated calling which utilizes the palindrome code. This diagram is a simplified representation of the essential parts and their interconnections which are of importance in the formation of the plaindrome code; these parts per se are constructed in known manner from digital circuits which are controlled by clock pulses and which need not be further elaborated herein.

The system for which the transmitter shown in FIG. 1 is intended has the following characteristics:

address code word $w$, length 10 bits palindrome code word $(pcw)_1 = ux_9u'$, length 19 bits $w = x_0x_1x_2 \ldots x_9$ $u = x_0x_1x_2 \ldots x_8$ $u' = x_8x_7x_6 \ldots x_0$ The length of the palindrome code word is a prime number, so that none of the palindrome code words is ambiguously or multi-detectable, with the exception of the 1-word and the 0-word.

The address code word $w$ is applied to the register 11 via line 10. This register comprises 10 stages which are numbered 1 to 10 and in which the bits of the address code word are stored. It is useful to assume that $x_0$ is stored in stage 1, $x_1$ in stage 2 etc.

The stages of register 11 are coupled to the stages of a register 12 which comprises 19 stages. Stage 1 of register 11 is coupled to the stages 1 and 19 of register 12, stage 2 of register 11 is coupled to the stages 2 and 18 of register 12 etc., and stage 10 of register 11 is coupled to stage 10 of register 12. At the instant at which the register 12 is activated to take over the information contents of register 11 the palindrome code word;

$(pcw)_1 = x_0x_1x_2 \ldots x_9 \ldots x_2x_1x_0$ is thus formed in the register 12.

The register 12 is constructed as a shift register and as a result of the coupling shown between stage 1 and stage 19 the register operates as a circulating store, the contents of which can circulate under the control of clock pulses in the direction which corresponds in the register to the direction from stage 19 to stage 1. It can thus be achieved that to the output of stage 1 a series of identical palindrome code words is delivered.

The output of stage 1 of register 12 is coupled to an input of a transmitter 13 which transmits the call. It is to be noted that for the transmission of the paging signal it may be desirable to convert the bivalent output signal of register 12 into another bivalent or multivalent signal. For example, this is intended to mean the balancing of the signal by conversion of an 0-element in the element pair 01 and of a 1-element in the element pair 10, or by using the bipolar code. Such signal translations or signal coding remain possible; it is merely necessary to employ the reversed translation in the receivers.

The transmitter shown in FIG. 1 transmits a signal to the receivers for each call, the said signal containing a series of identical palindrome code words as its information, the said receivers being adapted to detect the pattern of the digits 0 and 1 of their own palindrome code word.

When the length of the palindrome code word is an even number, it is formed as follows:

$$(pcw)_2 = ww'$$

Figure 2:
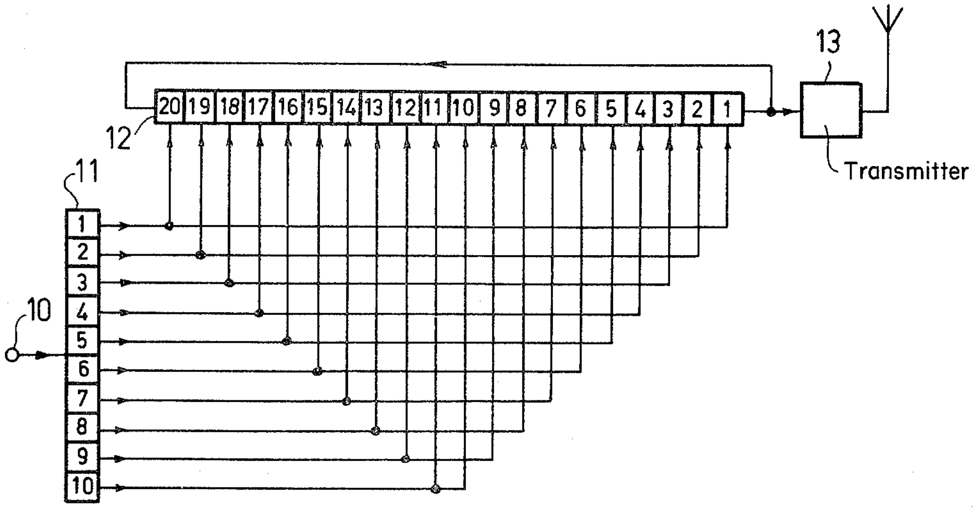

FIG. 2 shows the diagram of a transmitter for which n = 10 and m = 20. This transmitter differs from the transmitter shown in FIG. 1, for which n = 10 and m = 19, only in that stage 10 of register 11 is now also coupled to two stages of register 12.

Figure 3:
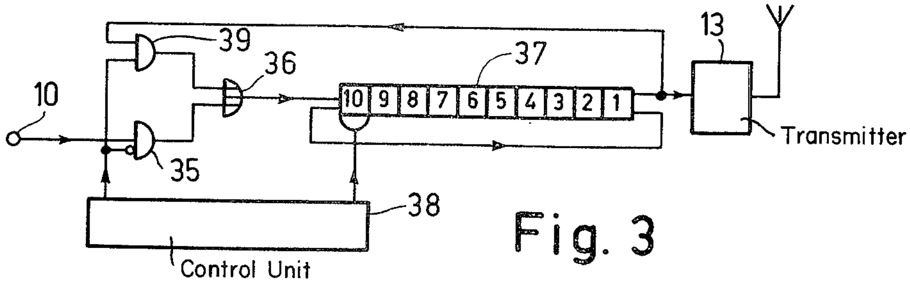

FIG. 3 shows the diagram of an alternative embodiment of the transmitter for which n = 10 and m = 2n = 20 or m = 2n−1 = 19. The address code word is introduced in series form into the shift register 37 via line 10, a gate 35 and an OR-gate 36. This shift register comprises ten stages. During the input of the address code word, the shift direction is adjusted in the direction from stage 10 to stage 1 by a control unit 38. The stage 1 of shift register 37 is coupled to stage 10 via AND-gate 39 and OR-gate 36. During the input of the address code word, AND-gate 39 is blocked and gate 35 is unblocked by control unit 38.

The shift register 37 has two possible shift directions. In the one shift direction, the information is shifted from stage 10 to stage 1 and, via AND-gate 39 and OR-gate 36, back to stage 10 when AND-gate 39 is unblocked. This is the shift direction: "to the right". In the other direction, the information is shifted from stage 1 to stage 10 and from stage 10, via an external coupling, back to stage 1. This is the shift direction "to the left". The two shift directions are controlled by control unit 38 and this unit also supplies the clock pulses, each of which shifts the information to the right or to the left over one bit position.

For the transmission of a palindrome code word having a length m = 2n, the control unit 38 shifts the contents of register 37 first to the right over n-1 bit positions, after which the contents are not shifted for one clock pulse, and subsequently the contents are shifted n-1 bit positions to the left, after which there will be no shift for one clock pulse. This cycle is repeated for each transmission of the palindrome code word.

When the palindrome code word has a length m = 2n−1, the control unit 38 performs the following cycle of operations. The contents of register 37 are first shifted n-1 bit positions to the right, after which the contents are shifted n−1 bit positions to the left, after which there is no shift for one clock pulse.

Figure 4:
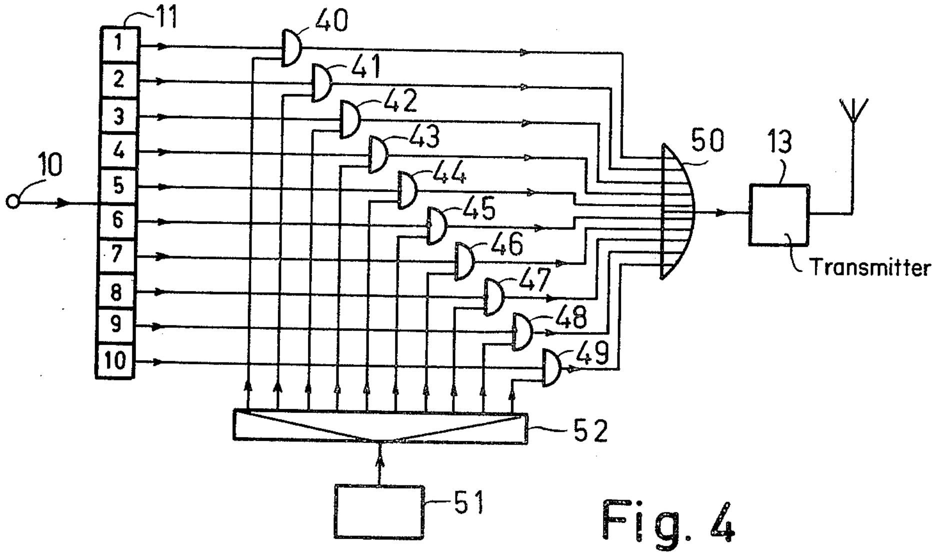

FIG. 4 shows the diagram of another alternative embodiment of the transmitter. Like in FIGS. 1 and 2, the address code word is introduced in a register 11 via a line 10. Each of the stages of this register is coupled, via an individual AND-gate 40 to 49 and a common OR-gate 50, to the input of the transmitter 13. The AND-gates 40 to 49 are controlled by a control unit 51 via a decoder 52. The control unit 5 can block an arbitrary one of the AND-gates 40 to 49 by applying the binary coded address of the AND-gate to the decoder. When an AND-gate 40 to 49 is unblocked, the bit of the relevant stage of register 11 is applied to the input of transmitter 13.

For the transmission of palindrome code word having a length m = 2n, control unit 51 successively generates the addresses of the AND-gates which are coupled to the stages 1, 2, 3, . . . . . , n−1 n, n, n−1, . . . . . , 3, 2, 1 of register 11; when m = 2n−1, this sequence is

**1, 2, 3, . . . . , n−1, *n*, n−1, . . . . , 3, 2, 1**

Figure 5:
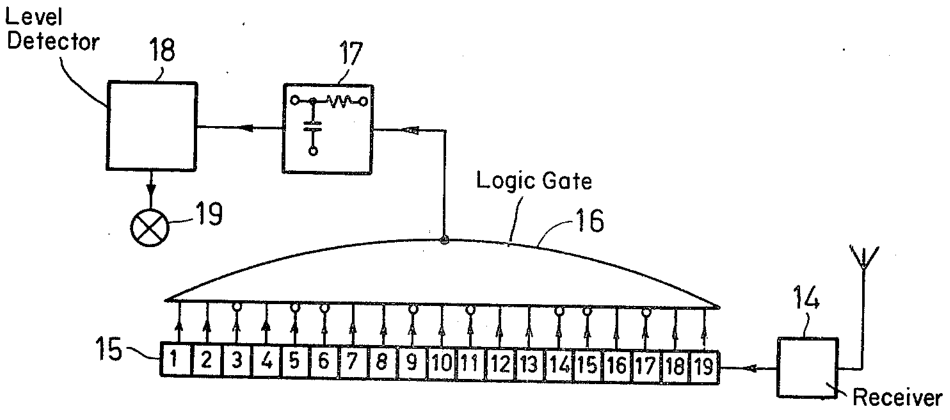

FIG. 5 shows the diagram of a selective paging receiver. This diagram is simplified in substantially the same manner as the diagram shown in FIG. 1; this is also applicable to the diagram of the FIGS. 6, 7, 8 and 9 which relate to other embodiments of the receiver.

The address code word of the receiver shown in FIG. 5 is:

w = 1101001101 (10 bits), and the palindrome code word is:

$(pcw)_1$ = 1101001101011001011 (19 bits).

The paging signal is received by the receiver 14 and is subsequently applied in regenerated form to the input of a register 15. This register comprises 19 stages and is constructed as a shift register. The register is controlled by clock pulses having a repetition frequency which is equal to the bit rate. Each clock pulse shifts the contents of the register over one bit position in the direction from stage 19 to stage 1.

The stages of register 15 are coupled to a corresponding number of inputs of a logic gate 16. This logic gate 16 is constructed such that it supplies a pulse when the pattern of the bits 0 and 1, present in the register, corresponds to the pattern of the digits 0 and 1 of the palindrome code word of the receiver.

The output of logic gate 16 is coupled to an integrator 17 which is coupled to a level detector 18. The latter switches on a lamp 19 or supplies an accoustic signal when the level of the output voltage of integrator 17 exceeds a given value. A call is thus indicated when the palindrome code word is detected a number of times in succession.

The bit combination in register 15 can be formed by the last bits of a first call and the first bits of a second call which adjoins the first call without spacing. The palindrome code words are not formed such that it is precluded that a bit combination of this kind can be a palindrome code word. It is then possible that a logic gate 16 of some other receiver reacts during the change-over from a first call to a second call. It is therefore desirable that the palindrome code word is repeated at least once without spacing for a call, and that a receiver indicates a call only after the palindrome code word has been detected at least twice in succession. This latter requirement can be satisfied by way of a suitable choice of the time constants of the integrator 17 and of the level at which the level detector 18 reacts.

The logic gate 16 of the receiver of FIG. 5 has a logic AND-function. A stage of register 15 which corresponds to the position of the digit 1 in the palindrome code word is coupled to a normal input of logic gate 16 (the stages 1, 2 4, 7, 8, 10, 12, 13, 16, 18, 19); 8 stages which correspond to the digit 0 is coupled to an inverted input (the stages 3, 5, 6, 9, 11, 14, 15, 17). The logic function is the AND-function of the variables of the stages which are coupled to a normal input and of the inverted values of the variables of the stages which are coupled to an inverted input.

If the length of the palindrome code word is an odd number (no prime number), other multi-detectable palindrome code words are possible in addition to the 0-word and the 1-word.

If a receiver is used whose palindrome code word is multi-detectable, logic gate 16 not only supplies a pulse when the palindrome code word is present in register 15, but also supplies a pulse for given cyclic permutations of the palindrome code word. This means that the number of output pulses of logic gate 16 will be larger than when the palindrome code word is not multi-detectable. The larger number of pulses will cause the level detector 18 to react sooner. Depending on the address, some receivers will thus indicate a call sooner than other receivers. If this dependency is undesirable, it can be eliminated by a different proportioning of the integrator 17 and the level detector 18 in the receivers whose palindrome code words are multidetectable.

Figure 6:
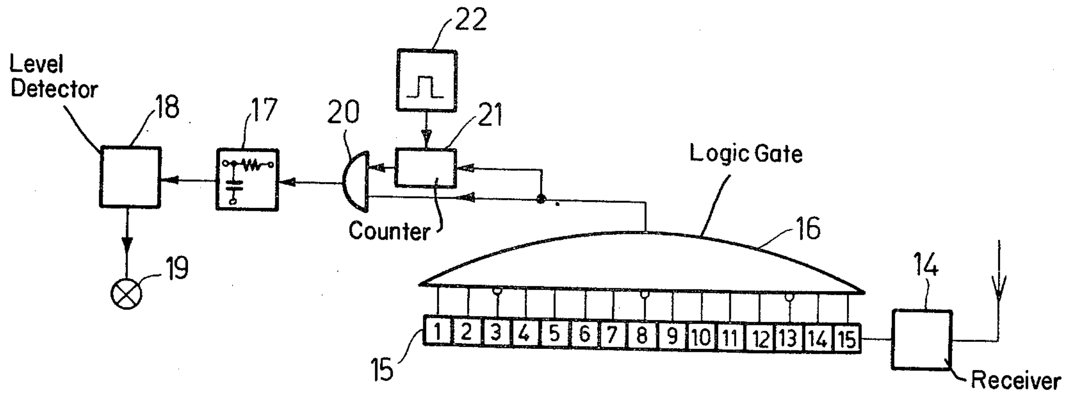

This dependency can also be prevented by using an additional circuit in the receiver, as is shown in FIGS. 6, in which the parts corresponding to FIG. 5 are denoted by the same reference numerals.

The receiver according to FIG. 6 has the address code word:

w = 11011110 (8 bits)

and the palindrome code word:

$(pcw)_1$ = 110111101111011 (15 bits), which is multi-detectable. (The characteristic distances are five bits and 10 bits).

When a series of these palindrome code words is received, logic gate 16 supplies a pulse three times per word length of 15 bits.

The output of logic gate 16 of FIG. 6 is coupled to an input of an AND-gate 20 and to the start input of a counter 21 which is coupled to a second input of AND-gate 20. When counter 21 is in the position O, AND-gate 20 is unblocked such that it applies a pulse to the integrator 17 when a pulse is received from logic gate 16.

The counter 21 is controlled by a clock pulse generator 22 whose repetition frequency is equal to the bit rate. Let use assume for the time being that counter 21 has fifteen positions. In order to explain the operation, it is useful to assume that the counter 21 is in the position O and that a first pulse appears on the output of logic gate 16. This first pulse is allowed to pass by AND-gate 20. This pulse furthermore starts the counter 21, with the result that the latter passes through the positions 1, 2, . . . . . 14 under the control of the clock pulses, after which it returns in the position O in which the counter remains until another start signal is received. In the positions 1, 2, . . . . 14 the counter 21 blocks the AND-gate, with the result that the latter, after a first pulse has been allowed to pass, remains blocked for fourteen bit periods. During these fourteen bit periods no output pulse of logic gate 16 can reach the integrator 17. The counter 21 is constructed in known manner such that it can be started only from the position 0, so that in these fourteen bit periods no output pulse of logic gate 16 has an effect.

According to FIG. 6, a receiver is thus realized in which the number of pulses which is applied to the integrator 17 for multi-detectable palindrome code words is equal to that for palindrome code words which are not multi-detectable.

The minimum distance between two output pulses of logic gate 16 in some or other receiver of the system is the smallest value of all characteristic distances of all multi-detectable palindrome code words. If the length of the palindrome code words is an odd number and the 0-word and the 1-word are excluded, the minimum distance is larger than two bits. This means that a counter 21 can be used whose number of positions is two smaller than the length of the palindrome code word. In the bit periods corresponding to these two positions logic gate 16 cannot supply an output pulse, so they are superfluous. For the receiver as shown in FIG. 6 this means that the positions 13 and 14 are superfluous, and that a counter 21 comprising thirteen positions suffices.

A further reduction of the number of positions can be realized by considering the receivers whose palindrome code words are multi-detectable separately. The palindrome code word of the receiver shown in FIG. 6 has the characteristic distances of five bits and ten bits. The minimum distance between two output pulses of logic gate 16 is therefore larger than four bits. In this case the positions 11, 12, 13, 14 of counter 21 can be dispensed with, and a counter comprising eleven positions suffices.

Figures 7, 8:
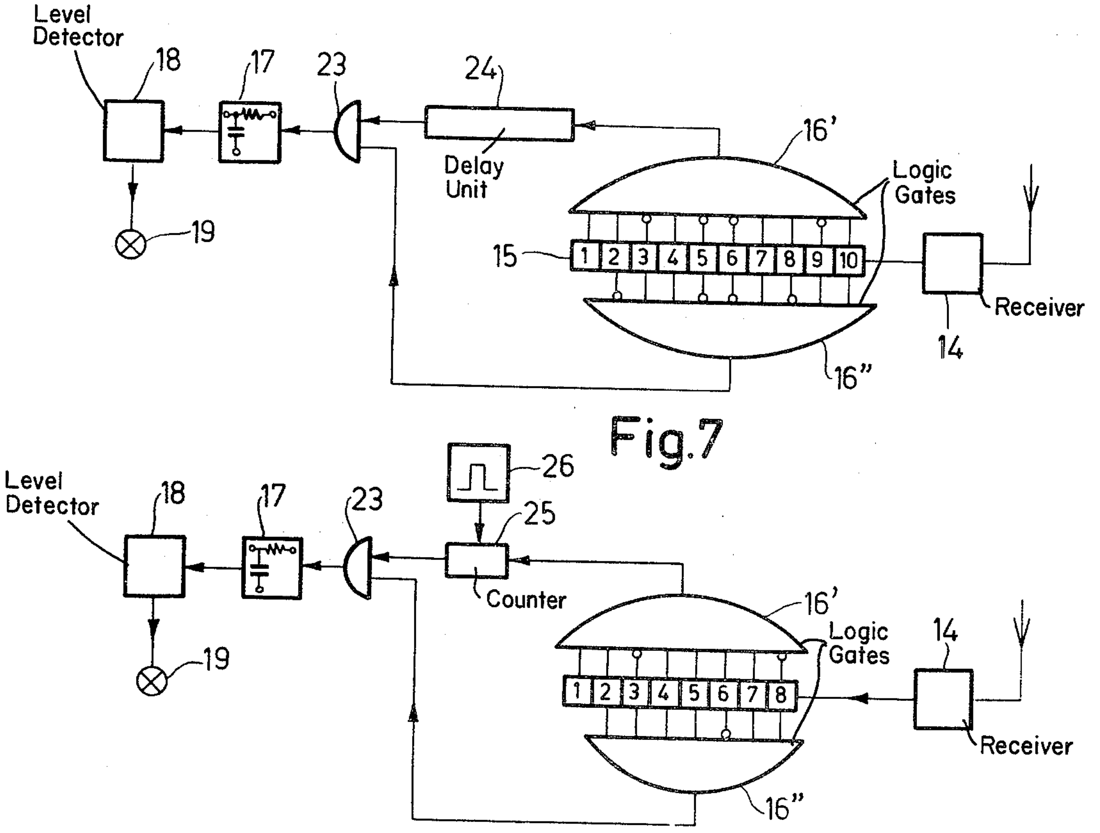

The diagram of an alternative embodiment of a receiver for a system in which no multi-detectable palindrome code words are used is shown in FIG. 7.

The receiver shown in FIG. 7 has the same address code word as the receiver shown in FIG. 5:

w = 1101001101 (10 bits), and the same palindrome code word:

$(pcw)_1 = ux_9u'$ = 1101001101011001011 (19 bits).

where:

u = 110100110

$x_9 = 1$ u' = 011001011.

The register 15 of the receiver shown in FIG. 7 comprises ten stages, which means as many stages as there are bits ($n$) of the address code word. Conncected to register 15 are two logic gates 16' and 16''. The logic gate 16' comprises ten inputs and serves for the detection of the part $ux_9$ of the palindrome code word; the logic gate 16'' comprises nine inputs and serves for the detection of the part $u'$ of the palindrome code word.

The output of logic gate 16' is coupled to an input of a delay unit 24 which produces a delay of nine bit periods. If the palindrome code word of the receiver is received, first logic gate 16' supplies an output pulse whilst nine bit periods later logic 16'' supplies an output pulse. The output pulse of delay unit 24 and the output pulse of logic gate 16'' activate an AND-gate 23 when they coincide in time, with the result that the latter AND-gate applies a pulse to integrator 17. This corresponds to the operation of the receiver shown in FIG. 5.

The delay unit 24 can be realized by using a shift register or a counter.

The number of bits of the palindrome code word of the receiver shown in FIG. 7 is odd, which results in a number of inputs of logic gate 16'' which is one smaller than the number of inputs of logic gate 16'. If the number of bits of the palindrome code word is even, so it is formed as $(pcw)_2 = ww'$, two logic gates are used, each gate comprising n inputs. One logic gate then serves for the detection of part $w$, whilst the other gate serves for the detection of part w' of the palindrome code word.

FIG. 8 shows the diagram of an alternative embodiment of a receiver for a multi-detectable palindrome code word.

The receiver shown in FIG. 8 has the same address code word as the receiver shown in FIG. 6:

w = 11011110 (8 bits).

and the same palindrome code word:

$(pcw)_1 = ux_7u'$ = 110111101111011 (15 bits), where u = 1101111

$x_7 = 0$ u' = 1111011.

This multi-detectable palindrome code word has the characteristic distances of five bits and ten bits. The logic gate 16' and 16'' serve for the detection of the part $ux_7$ and the part $u'$, respectively, of the palindrome code word. The output of logic gate 16' is coupled to the start input of a counter 25 which is coupled to a clock pulse generator 26. For the time being it is assumed that the counter 25 has fifteen positions, i.e. as many positions as the counter 21 shown in FIG. 6. However, the counter 25 differs from the counter 21 in that counter 25 supplies a signal in position 7 which actuates AND-gate 23. The counter 25 can be started only when it is in position O, and after the counter has been started, it passes through the positions 1, 2, . . . . . ., 14 and subsequently, assumes the position O again in which it remains until another start signal is received.

When the palindrome code word of the receiver is received, logic gate 16' first supplies an output pulse whilst seven bit periods later logic gate 16'' supplies an output pulse. The output pulse of logic gate 16' starts counter 25, with the result that this counter supplies an output pulse, seven bit periods later, which coincides in time with the output pulse of logic gate 16''. The output pulse of counter 25 and the output pulse of logic gate 16'' actuate the AND-gate 23 when they coincide in time, with the result that this gate applies a pulse to the integrator 17. The AND-gate 23 is in any case blocked for the next fourteen bit periods, i.e. during the counter positions 8, 9, . . . . . , 14, 0, 1, . . . . . 6, with the result that during 15 bit periods at the most one pulse is applied to integrator 17. This corresponds to the operation of the receiver according to FIG. 6.

Like for the receiver of FIG. 6, it can be demonstrated for the receiver of FIG. 8 that a counter comprising eleven positins suffices.

The described method of calling receivers can be combined with the transmission of messages to the receivers. A possibility to this end is that the central bit $x_{n-1}$ of the palindrome code word $(pow)_1 = ux_{n-1}u'$ is used as a bit for the transmission of variable information. A further possibility yet is that the central three bits are used for the transmission of variable information. This offers the possibility of transmitting two-bit variable information because according to the palindrome code the first and the third of the three bits must be identical. The address information is then contained in the first n—2 bits of the palindrome code word. (The last n—2 bits are determined by the first n—2 bits). Continuing this line of thought, an increasing number of the central bits of the palindrome code word can be used for the transmission of the variable information, until in the extreme case only variable information is transmitted and no address information. The latter case involves a system comprising one transmitter and one receiver and the transmission of variable information from the transmitter to the receiver. This method of transmission of variable information is four-fold redundant, because each palindrome code word must be transmitted at least twice without spacing. However, it is an advantage that the receiver need not be synchronized to the palindrome code words.

Figure 9:
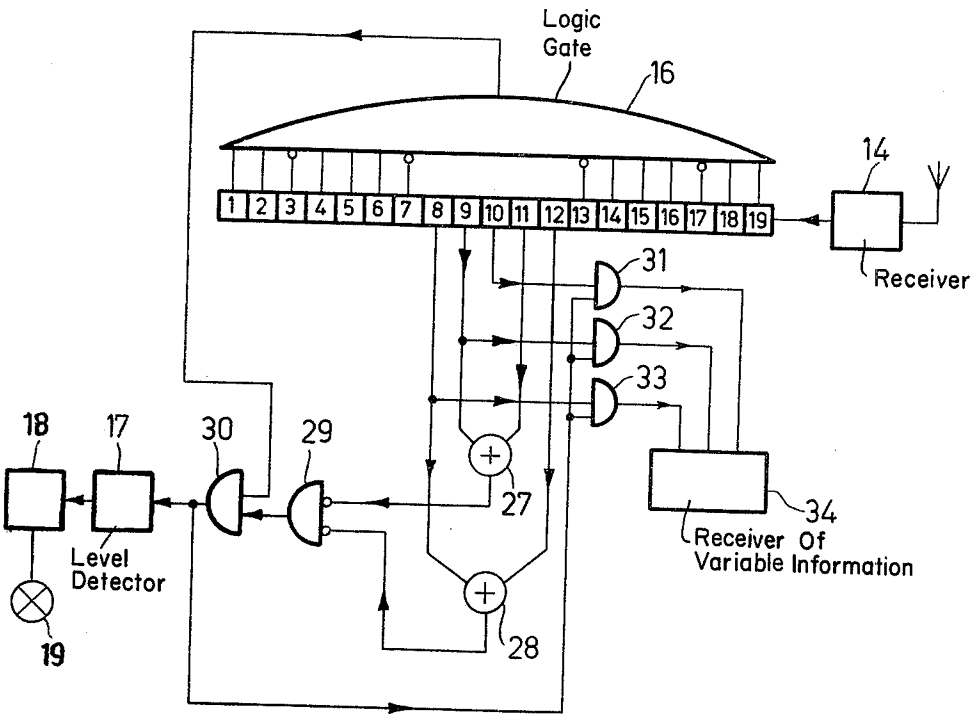

FIG. 9 shows the diagram of a receiver for a system in which the central five bits of a palindrome code word are used for the transmission of variable information. The palindrome code word of the receiver is:

$$(pcw)_1 = 1101110x_8x_9x_{10}x_{11}x_{12}0111011 \text{ (19 bits)},$$

where $x_8$, $x_9$, $x_{10}$, $x_{11}$, $x_{12}$ are the variable information bits.

The length of the palindrome code word is a prime number, so that a receiver of the type shown in FIG. 5 can be used.

The logic gate 16 (FIG. 9) detects the pattern of the digits 0 and 1 which are contained in the first seven bits and the last seven bits of the palindrome code word, i.e. the address information. The modulo-two gates 27 and 28 detect whether or not the bits of the central five stages of shift register 15 satisfy the requirement of the palindrome code. If they do, both modulo-two gates supply a signal which represents a binary zero. The output signals of the modulo-two gates 27 and 28 are inverted by gate 29 and are subsequently coupled to each other by a logic AND-function. As a result, gate 29 supplies a pulse if the bits of the central five stages of shift register 15 satisfy the requirement of the palindrome code.

The output of logic gate 16 and the output of gate 29 are each connected to an input of AND-gate 30, the output of which is connected to integrator 17 and to an input of each of the AND-gates 31, 32 and 33. The latter AND-gates are connected between the stages 8, 9 and 10 of shift register 15 and a receiver of variable information 34.

If logic gate 16 detects the address of the receiver and it is at the same time detected that the bits of the central five stages of shift register 15 satisfy the condition of the palindrome code, logic gate 16 and gate 29 simultaneously supply an output pulse, with the result that AND-gate 30 applies a pulse to integrator 17 and to the AND-gates 31, 32 and 33. The bits of the stages 8, 9 and 10 of shift register 15 are then transmitted to the receiver 34 via the AND-gates 31, 32 and 33, the said receiver decoding and possibly displaying the variable information. The latter can be made dependent of the reaction of level detector 18 in order to prevent the display of incorrect information. In this respect it may be desirable to render the transmission of the information bits from the shift register 15 to the receiver 34 already dependent of the reaction of the level detector 18.

MATHEMATICAL ANALYSIS OF THE PALINDROME CODE.

Some of the properties assigned to the palindrome code in the foregoing will be derived hereinafter.

An examination will be made of the structure of a palindrome code word which is ambiguously detectable or multi-detectable. Assume that X and Y are two palindrome code words, and also assume that the cyclic permutation of X over $\alpha$ bits is equal to Y. The following relations then apply:

$$X = x_0x_1x_2 \ldots\ldots x_{m-1} \qquad 1.$$

$$Y = y_0y_1y_2 \ldots\ldots y_{m-1} \qquad 2.$$

$$x_i = y_{i+\alpha} \text{ for all } i=0, 1, 2, \ldots\ldots, m-1 \qquad 3.$$

$$x_j = x_{m-1-j} \text{ for all } j = 0, 1, 2, \ldots\ldots, m-1 \qquad 4.$$

$$y_k = y_{m-1-k} \text{ for all } k = 0, 1, 2 \ldots\ldots, m-1 \qquad 5.$$

(The calculations of the indexes are all effected in the modulo $m$).

The relations (4) and (5) are the conditions of the palindrome code; the relation (3) expresses the assumption that the cyclic permutation of X over $\alpha$ bits is equal to Y.

It follows from the relations (3), (4) and (5) that:

$$x_i = y_{i+\alpha} = y_{m-1-(i+\alpha)} = x_{m-1-(i+\alpha)-\alpha} = x_{m-1-(m-1-(1+\alpha)-\alpha)},$$

from which it is derived that:

$$x_i = x_{i+2\alpha}$$

In general:

$$x_{i+s.2\alpha} = x_{i+r.2\alpha} \qquad 6.$$

in which $s$ and $r$ are integer numbers.

According to relation (6) there are series of bits which must be identical. A series of this kind is referred to as a string. The indexes of the bits of a string can be represented by:

$$j = i + 2p\,\alpha \text{ (modulo } m)$$

in which $p$ is an integer number.

PROPERTY 1

Two bits belong to the same string if the following applies to their indexes:

$$j_2 - j_1 = r(2\,\alpha, m)$$

in which $r$ is an integer number and $(2\,\alpha, m)$ is the greatest common divisor of 2 $\alpha$ and $m$.

DEMONSTRATION

According to relation (6) two bits belong to the same string if the following applies to their indexes $j_1$ and $j_2$:

$$j_1 \equiv i + 2p_1\,\alpha \text{ (modulo } m)$$

$$j_2 \equiv i + 2p_2\,\alpha \text{ (modulo } m)$$

in which $p_1$ and $p_2$ are integer numbers.

The following then also applies:

$$j_1 - j_2 \equiv 2\alpha(p_1 - p_2) \text{ (modulo } m)$$

This congruence can be solved only if the greatest common divisor of 2 $\alpha$ and $m$, denoted as $(2\,\alpha,m)$, is a divisor of $j_1 - j_2$, so that:

$$j_1 - j_2 = r(2\,\alpha, m)$$

in which $r$ is an integer number. Q.E.D.

One of the consequences of property 1 is that, if the numbers 0, 1, 2, . . . . . , $(2\ \alpha, m)-1$ are taken for $i$, the bits whose indexes are formed by these numbers belong to different strings. These numbers identify the strings and are referred to as the characteristic of the string.

From the foregoing, the following two properties follow directly.

PROPERTY 2

A bit having the index $j$ belongs to the string having the characteristic $i$ if:

$$j \equiv i \ (\text{modulo } (2\ \alpha, m)).$$

PROPERTY 3

The number of strings is equal to $(2\ \alpha, m)$.

PROPERTY 4

The number of bits of a string amounts to $$\frac{m}{(2\alpha,m)}$$

DEMONSTRATION

The number of bits of a string is determined as follows. This number is equal to the largest possible number of values of $p$ which each produce a different value of $j$ at a given value of $i$ in the relation:

$$j \equiv i + 2p\ \alpha (\text{modulo } m).$$

In order to determine this number, it is first assumed that two values of $p$ produce the same value of $j$:

$$j \equiv i + 2p_1\ \alpha (\text{modulo } m)$$

$$j \equiv i + 2p_2\ \alpha (\text{modulo } m).$$

The following must then hold good:

$$2p_1\ \alpha = 2p_2\ \alpha (\text{modulo } m).$$

This equation can be solved only if:

$$P_1 \equiv P_2 \ (\text{modulo } \frac{m}{(2\alpha,m)},$$

so that, if the numbers 0, 1, 2, . . . . . , $$\frac{m}{(2\alpha,m)} - 1$$

are taken for $p$, each of these numbers produces a unique value for $j$. If a number larger than or equal to $$\frac{m}{(2\alpha,m)}$$

is taken for $p$, this number can always be reduced modulo $$\frac{m}{2\alpha,m}$$

to a number from the said series, so that no new value of $j$ is found. Consequently, the number of bits of a string is equal to $$\frac{m}{(2\alpha,m)} \cdot Q.E.D.$$

PROPERTY 5

The strings determine all $m$ bits of the palindrome code words.

DEMONSTRATION

It follows from the properties 1 and 2 that a bit cannot belong to two strings. The number of strings amounts to $(2\ \alpha, m)$, and the number of bits of a string amounts to $$\frac{m}{(2\alpha,m)}.$$

The total number of (different) bits which can be contained in the strings thus amounts to:

$$(2\alpha,m) \cdot \frac{m}{(2\alpha,m)} = m \text{ bits.} \quad Q.E.D.$$

PROPERTY 6

The bits of the strings with the characteristics $i$ and $(2\ \alpha, m)-1-i$ are the same.

This can be demonstrated as follows:

If the bit having the index $j$ belongs to the string having the characteristics $i$, according to property 2 the following is applicable:

$$j \equiv i \ (\text{mod}(2\ \alpha, m))$$

so that it is also applicable that:

$$m-1-j \equiv m-1-i = (2\ \alpha,m)-1-i \ (\text{modulo}(2\alpha,m)),$$

which means that if the bit having the index $j$ belongs to the string having the characteristic $i$, the bit having the index $m-1-j$ belongs to the string having the characteristic $(2\ \alpha,m)-1-i$. According to the palindrome code:

$$x_j = x_{m-1-j},$$

with the result that the bits of the strings having the characteristics $i$ and $(2\ \alpha, m)-1-i$ are the same. Q.E.D.

It follows from the properties 1 to 5 that the first $(2\ \alpha, m)$ bits of an ambiguously detectable or multidetectable palindrome code word determine all following bits. This means that a palindrome code word of this kind can be sub-divided into identical sub words having a length of $(2\ \alpha, m)$ bits. It follows from property 6 that these subwords have the form of a palindrome code word.

$m$ is a prime number $(m = 2\ n-1)$

The values which are of importance for $\alpha$ are 1, 2, . . . . . ,m−1. For all these values $$(2\ \alpha, m) = 1.$$

The length off the sub-word is one bit. The only palindrome code words having a sub-word of one bit are the 0-word and the 1-word. These words are multi-detectable but not ambiguously detectable, with the result that in this group no ambiguously detectable palindrome code words occur and, with the exception of the 0-word and the 1-word, no multi-detectable palindrome code words occur.

*m* is an odd number (no prime number) ($m = 2n - 1$)

In this case there are a number of values of $\alpha$ for which ($2\alpha, m$) is larger than one. Because *m* is an odd number:

$$(2\alpha, m) = (\alpha, m)$$

and because ($\alpha$, m) is a divisor of $\alpha$, $\alpha$ is an integer number of times the length of a sub-word. The cyclic permutation of a palindrome code word over an integer number of sub-words produces the palindrome code word itself, so that in this group no ambiguously detectable palindrome code words occur.

*m* is an even number ($m = 2n$)

In this case: $(2\alpha, m) = (2\alpha, 2n) = 2(\alpha, n)$.

*n* is a prime number

In this case there are only two possible values for the length of the sub-word: $(2\alpha, m) = 2$ for $\alpha = n$ or $$(2\alpha, m) = m \text{ for } \alpha = n = \frac{m}{2}.$$

The length of the sub-word is therefore equal to two bits or equal to *m* bits. The only palindrome code words having a sub-word of two bits are the 0-word and the 1-word. The palindrome code words having a sub-word of *m* bits are the palindrome code words themselves, so that all palindrome code words are ambiguously detectable or multi-detectable. This property was already derived in the chapter: "General Description of the Palindrome Code" from the expression:

$$(pcw)_2 = ww'$$

If the collection of admitted palindrome code words is chosen such that the cyclic permutation over $\alpha = n$ bits of an admitted palindrome code word does not result in an other admitted palindrome code word, none of the remaining palindrome code words will be ambiguously detectable or multi-detectable. (The 0-word and the 1-word for which $w = w'$ are then automatically also excluded). This amounts to the exclusion of the address code words which are the mirror image of an address code word admitted to the word collection W(*n*). The palindrome code words of the group for which $w = w'$ are only multi-detectable and could eventually be admitted.

*n* is an odd number (no prime number).

In this case there are still other values for the length ($2\alpha$, *m*) of the sub-word than the values 2 and *m* of the previous case.

The value of ($\alpha$,*n*) is an odd number, because *n* is an odd number, so that the number of sub-words $$\frac{m}{(2\alpha, m)} = \frac{n}{(\alpha, n)}$$

is an odd number.

A palindrome code word having an odd number of subwords vv' is as follows:

$$(pcw)_2 = vv'vv' \ldots\ldots v\ v' \ldots\ldots vv'vv' = w\ w'.$$

The cyclic permutation of this palindrome code word over an integer number of sub-words produces the palindrome code word itself. The cyclic permutation over an integer number of sub-words plus one half sub-word produces the palindrome code word:

$$(pcw)_2 = v'vv'v \ldots\ldots v'\ v \ldots\ldots v'vv'v = w'\ w$$

so that all palindrome code words consisting of an odd number of sub-words are ambiguously detectable or multi-detectable, If the address code words which are the mirror image of an admitted address code word are excluded, the remaining palindrome code words will be unambiguously detectable. The address code-words for which $w = w'$ need not be excluded. This is because the palindrome code words which are formed therefrom are only multi-detectable. In addition to the latter multi-detectable code words there are also other palindrome code words possible which are multi-detectable.

*n* is an even number

In this case the number of sub-words is an even or an odd number. If the number of sub-words is odd, the same is applicable as in the previous case. If the number of sub-words is even, the palindrome code word is as follows:

$$(pcw)_2 = vv'vv' \ldots vv'\ vv' \ldots vv'vv' = w\ w'$$

in which case $w = w'$.

The cyclic permutation of this palindrome code word over an integer number of sub-words produces the palindrome code word itself. The cyclic permutation over an integer number of sub-words plus one half sub-word produces the palindrome code word:

$$(pcw)_2 = v'vv'v \ldots v'v\ v'v \ldots v'vv'v$$

so that all palindrome code words having an even number of sub-words are ambiguously detectable or multi-detectable. If all address code words for which $w = w'$ are excluded from the word collection W(*n*), all palindrome code words having an even number of sub-words are excluded, so that ambiguously detectable palindrome code words are no longer possible. However, palindrome code words which are still usable are then also excluded. An example for $n = 4$ is the address code word $w = w' = 1001$; the palindrome code word thereof is $(pcw)_2 = 10011001 = vv'vv'$, where $v = 10$ and $v' = 01$. The cyclic permutation of this palindrome code word over one half sub-word (two bits) produces: $(pcw)_2 = 01100110 = v'vv'v$. The address code word 1001 can therefore be admitted if the address code word 0110 is excluded. The said step, consequently, is adequate to avoid ambiguous detectability, but it is not necessary. Also in this case multi-detectable palindrome code words remain possible after the said step has been taken.

What is claimed is:

1. An arrangement for generating a plurality of signals representing a second code from a plurality of binary coded signals of a first code, said plurality of first code signals comprising *n*-element address words and said plurality of second code signals comprising *m*-element words, said arrangement comprising: a register for the storage of signals representing *n*-elements of an address code word of the first code;

means for determining a series of $m$-element positions, each position adapted for receipt of a signal representing a code word element, and means for transferring each element-representing-signal from the register containing said first code word to two of said $m$-element positions of the series of $m$-element positions so that with a given sequence of the $n$-element positions, the first $n$-element positions of the $m$-element series contain the address code word of the first code in said given sequence and the last $n$-element positions contain the address code word in the reversed sequence.

2. An arrangement as claimed in claim 1, wherein it comprises an input unit comprising $n$ outputs and a shift register comprising $m$ stages, the $n$ outputs of the input unit being coupled to the first $n$ stages and the last $n$ stages of the shift register.

3. An arrangement as claimed in claim 1, wherein the register for storing the $n$ elements of a code word of the first code is formed by a shift register which is provided with $n$ stages, the shift register being adapted for shifting the information contents in two possible directions, a control unit being provided for shifting the information contents over one stage in one direction a number of times in succession, followed by shifting of the information contents over one stage on the other direction, a number of times on succession one of the stages of the shift register being provided with an output for the code word of the second code.

4. An arrangement as claimed in claim 1, wherein the register for storing the $n$ elements of a code word of the first code comprises $n$ stages, each of the $n$ stages being coupled, via an individual AND-gate and a common OR-gate, to an output for the code word of the second code, a control unit being provided for controlling the AND-gates such that they are first rendered suitable for the transfer of a code element in a given sequence, and subsequently in the reversed sequence.

5. An arrangement for detecting messages transmitted in accordance with a second code developed from an $n$-element binary first code, the elements of each code word of the first code being projected on the first $n$ positions in given sequence and onto the last $n$ positions in reverse sequence of an $m$-element second code word, where $m$ is either 2n-1 or $2n$, words of said second code being transmitted at least twice in succession without spacing, said arrangement comprising;

a shift register having $m$ stages, said shift register having an input for receiving the elements of the code words of the second code;

a logic gate having inputs which are coupled to the stages of the shift register;

means for integrating, said integration means responsive to the output of the logic gate; and discriminating means responsive to the integrator output for discriminating the level of the voltage of the integrator.

6. An arrangement as claimed in claim 5 wherein the arrangement includes a counter, the output of the logic gate being coupled, via an AND-gate to said integration means and to a start input of said counter, said counter being coupled to the AND-gate and a source of clock pulses, said counter being controlled by the logic gate and controlling the AND-gate such that a first output pulse of the logic gate is transferred, via the AND-gate, to said integrator means the AND-gate being subsequently blocked for a number of element periods.

7. An arrangement for detecting messages transmitted in accordance with a second code developed from an $n$-element binary first code, the elements of each code word of the first code being projected on the first $n$ positions in given sequence and onto the last n positions in reverse sequence of an $m$-element second code word, where m is either $2n1$ or $2n$, words of said second code being transmitted at least twice in succession without spacing, said arrangement comprising;

a shift register having n stages, said shift register having an input for receiving the elements of the code words of the second code;

a first logic gate which is provided with inputs which are coupled to the stages of the shift register;

a second logic gate which is provided with inputs which are coupled to the stages of the shift register;

an integrator;

and an AND-gate responsive to said first and second logic gates for coupling to said integrator.

8. An arrangement as claimed in claim 7, wherein the output of one of the logic gates is coupled to the AND-gate via a delay unit.

9. An arrangement as claimed in claim 7, wherein the output of one of the logic stages being coupled to a start input of a counter, the counter being coupled to the AND-gate and to a source of clock pulses, said counter being controlled by the logic gate and controlling the AND-gate such that a first output pulse of the other logic gate, appearing after a given delay after a first output pulse of the one logic gate, is transferred to the integrator via the AND-gate, the AND-gate being subsequently blocked for a number of element periods.

* * * * *

UNITED STATES PATENT AND TRADEMARK OFFICE
CERTIFICATE OF CORRECTION

PATENT NO. : 3,909,781

DATED : September 30, 1975

INVENTOR(S) : THIJS KROL ET AL

It is certified that error appears in the above-identified patent and that said Letters Patent are hereby corrected as shown below:

Column 2, lines 31-33, "$w = x_0x_1x_2....X_{n-2}x_{n-1}$ (n bits)" should be: --$w = x_0x_1x_2....x_{n-2}x_{n-1}$ (n bits)-- lines 41-43, "$(pcw)_2 = x_0x_1x_2....X_{n-2}x_{n-1}x_{n-1}x_{n-2}....x_2x_1x_0$ (2)" should be: --$(pcw)_2 = x_0x_1x_2....x_{n-2}x_{n-1}x_{n-1}x_{n-2}....x_2x_1x_0$ (2)-- line 52, "mirrorsymmetrically" should be --mirror-symmetrically-- line 54, "mirrorsymmetrically" should be --mirror-symmetrically-- line 65, "$u' = X_{n-2}...x_2x_1x_0$," should be: --$u' = x_{n-2}...x_2x_1x_0$,--

Column 4, line 12, "w(n)" should be --W(n)-- lines 60-67 and Column 5, lines 1-15, correct the chart as follows:

UNITED STATES PATENT AND TRADEMARK OFFICE

CERTIFICATE OF CORRECTION

PATENT NO. : 3,909,781

DATED : September 30, 1975

INVENTOR(S) : THIJS KROL ET AL

It is certified that error appears in the above-identified patent and that said Letters Patent are hereby corrected as shown below:

| length m | maximum number of code words of W(n) | |
|---|---|---|
| prime number | $2^n = 2^{\frac{m+1}{2}}$ | |
| (m = 2n-1) | $2^n - 2 = 2^{\frac{m+1}{2}} - 2$ | A |
| odd number (no prime number) (m = 2n-1) | $2^n = 2^{\frac{m+1}{2}}$ | |
| twice a prime number (m = 2n) | $2^{n-1} + 2^{\frac{n-1}{2}} = 2^{\frac{m-2}{2}} + 2^{\frac{m-2}{4}}$ | |
| | $2^{n-1} - 2^{\frac{n-1}{2}} = 2^{\frac{m-2}{2}} - 2^{\frac{m-2}{4}}$ | A |
| twice an odd number (m = 2n) (n is no prime number) | $2^{n-1} + 2^{\frac{n-1}{2}} = 2^{\frac{m-2}{2}} + 2^{\frac{m-2}{4}}$ | |
| twice an even number (m = 2n) | $2^{n-1} - 2^{\frac{n-2}{2}} = 2^{\frac{m-2}{2}} - 2^{\frac{m-4}{4}}$ | |

UNITED STATES PATENT AND TRADEMARK OFFICE

CERTIFICATE OF CORRECTION

PATENT NO. : 3,909,781

DATED : September 30, 1975

INVENTOR(S) : THIJS KROL ET AL

It is certified that error appears in the above-identified patent and that said Letters Patent are hereby corrected as shown below:

Column 7, line 14, "diagram" should be --diagrams--

Column 8, lines 49 and 55, "O" (letter) should be --0-- (zero)

Column 9, line 61, after "The delay" insert --of delay--

Column 10, lines 31 and 33, "O" (letter) should be --0-- (zero)

line 58, "$(pow)_1$" should be --$(pcw)_1$--

Column 13, lines 63-67, "$\frac{m}{2\ \alpha,m}$" should be --$(\frac{m}{2\ \alpha,m})$--

Column 14, line 60, "subwords" should be --sub-words-- line 66, "off" should be --of--

Column 16, line 12, --,-- (comma) should be --.-- (period)

Claim 7, line 7, "2nl" should be --2n-1--

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*